July 6, 1965 M. METH 3,193,368
APPARATUS FOR VERTICALLY DRAWING GLASS
Filed Sept. 25, 1961 2 Sheets-Sheet 1
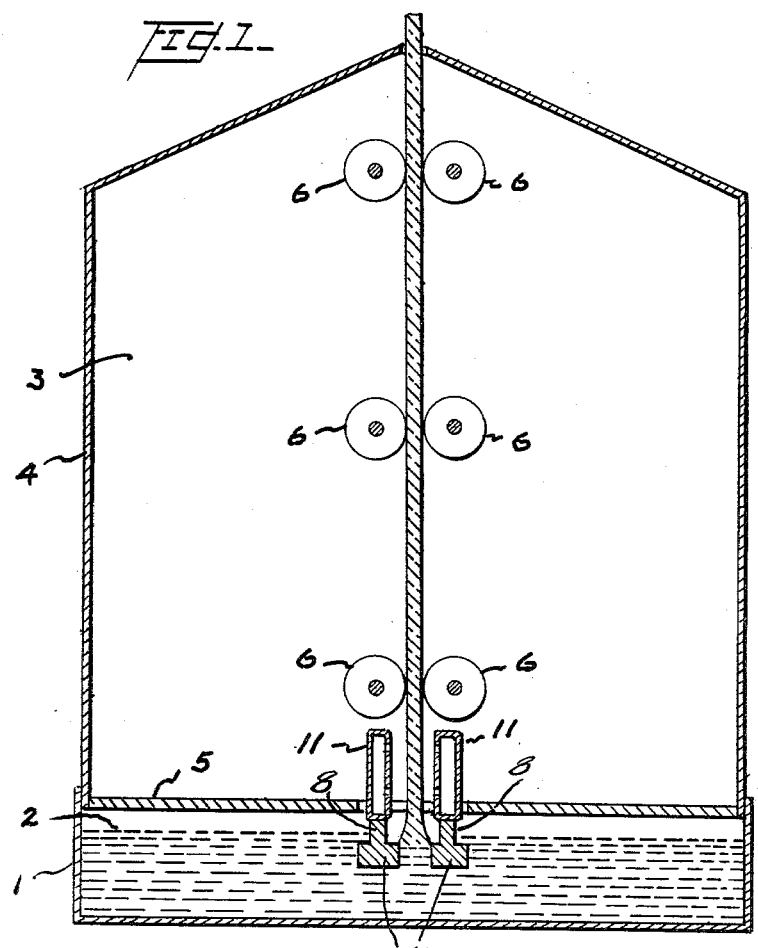
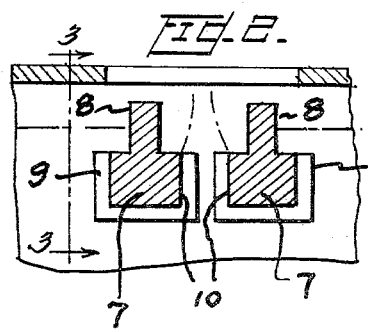
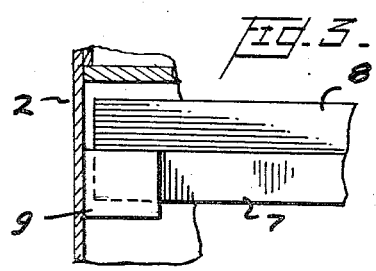
INVENTOR
*Max Meth,*
BY *Hudson Davis*
ATTORNEY

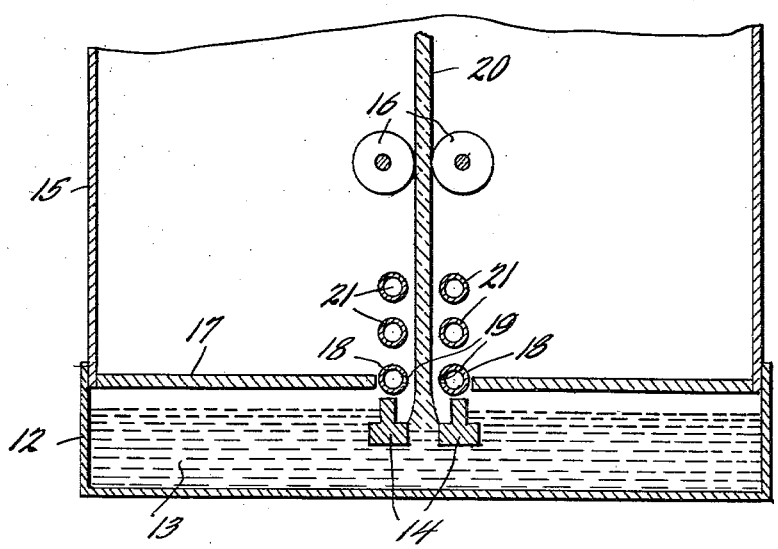
FIG-4-
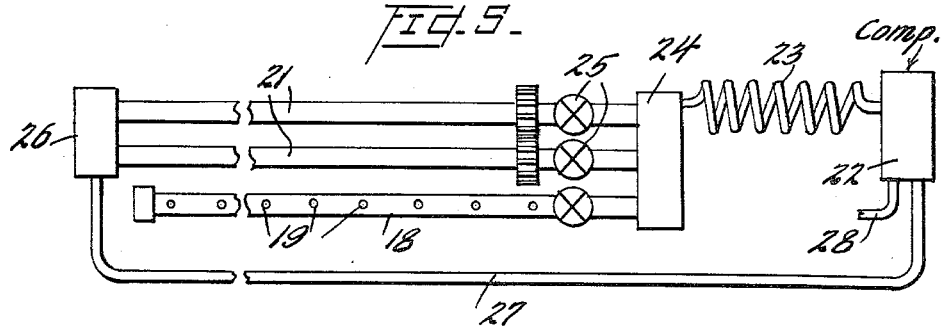
FIG-5-

_United States Patent Office_

3,193,368
Patented July 6, 1965

3,193,368
APPARATUS FOR VERTICALLY DRAWING GLASS
Max Meth, 212 Atlantic Ave., Atlantic City, N.J.
Filed Sept. 25, 1961, Ser. No. 140,400
2 Claims. (Cl. 65—206)

This invention relates to the manufacture of glass by drawing into sheet form and has for its object to improve the quality of the sheets by reducing the wavy form and uneven thickness always found in the finished product.

It is conventional to draw glass in a continuous sheet from a molten mass vertically upwardly through a zone of formation where it passes from plastic to solid condition and thereafter to cut it to desired length and width. In the Faucault process the sheet remains in the same vertical plane for at least 50 inches during its formation whereas in the Colburn process the sheet travels vertically some 24 inches and is then bent at right angles whereupon it travels through an annealing zone. In both processes the finished product has a wavy appearance and contains unevennesses which are believed to be induced in the lowermost part of operation at the time when the glass is still in highly plastic condition.

In my opinion, there are two principal causes for these imperfections. First, the glass is generally drawn upwardly from the molten mass past a device known variously as a debiteuse, a drawing block or a drawing bar. It is made of a refractory material which must resist the heat of the molten mass and the abrasive and chemical action of the glass being drawn therepast. However, it frequently happens that small pieces of it break off and small cracks occur which are almost impossible of detection unless the device is frequently removed and examined. The imperfections in the device impart imperfections to the glass which do not disappear in the drawing operation.

The second cause of imperfections is failure to control the cooling of the glass in its first stage of drawing, that is, between the time when it leaves the molten mass and when the outermost surface or skin thereof first begins to solidify.

The principal objects of this invention are to provide two parallel draw bars each firmly anchored in the walls of the vat containing the molten mass and to regulate the position of the lower portion of these bars so that they will be well submerged in the molten mass. Further, the bars themselves have extensions which project outwardly above the molten mass which serve the double purpose of forming skimmers and of forming a dam on each side of the draw to aid in blocking furnace gases from reaching the draw and the zone of sheet formation. Still further, these extensions may serve as supports for coolers on each side of the draw as the draw begins its travel into sheet form, thus forming a continuous closed wall from the molten mass into the zone of formation.

Thus, I accomplish the following objects: I place the main body or working portion of the draw bars in complete glass submersion which prolongs their life in comparison with the usual practice of partial submersion where the debiteuse is subjected to the temperature of glass and air, and I set up a condition of isolation of the draw at the initiation of sheet formation such that the only air or gas to which the draw is submitted can be specifically controlled. In other words, the draw is contained by the draw bars, the extensions and the coolers which thus define an area exetnding from the molten glass well into the zone of sheet formation into which no gas or air can enter except as may be introduced by the coolers.

As a modification of the above described coolers, I may use pairs of coolers of tubular form, all pairs being vertically spaced above the draw bars and respectively spaced from the glass sheet.

Other objects and advantages will become hereinafter more fully apparent as reference is had to the accompanying drawings, in which FIGURE 1 is a vertical cross-section taken through a vertical sheet glass drawing furnace and forming compartment of the conventional type employing the Faucault process, FIGURE 2 is a detailed enlarged view of the drawbars of FIGURE 1 showing the supports, FIGURE 3 is a vertical detail cross-section taken along the lines 3—3 of FIGURE 2, FIGURE 4 is a view similar to FIGURE 1 showing a modified type of cooler, and FIGURE 5 is a diagrammatic view showing the operation of the coolers.

More particularly, 1 indicates a vat which is a part of a furnace and which contains molten glass 2. Immediately above the vat 1 is the compartment 3 having side walls 4 and a floor 5, into which glass is drawn vertically in sheet form by the several pairs of driven rollers 6.

Located in the vat 1 are two spaced drawbars 7, 8 each of which is supported at each end by a bracket 9 fixed to a wall of the vat. Each drawbar has a main body portion 7 which may appropriately be square in cross-section, and an extension 8 extending the length thereof and being of more narrow cross-section. It too may be square but of substantially reduced area. The main portion 7 of each drawbar is immersed to a substantial depth in the molten mass 2 whereas the extensions 8 are immersed in the molten mass at their lower portions but project well above the surface of the molten mass 2.

As the glass is drawn by the rollers 6 into the compartment 3 it is drawn over and past the facing or working surfaces 10 of drawbars but the adjoining surfaces of the extensions 8 are set back from the surface 10 so that the draw of the glass as it leaves the molten mass does not contact the extensions 8.

The extensions 8 serve as skimmers to prevent debris on top of the molten mass from being drawn upwardly between the drawbars, and these extensions 8 aid in preventing flue gases of the furnace from entering the compartment 3. Additionally, the extensions 8 act as supports for coolers 11 which extent the length of the extensions 8 horizontally and from the tops of the extensions 8 well into the compartment 3.

The coolers 11 may be of any conventional or special type. As illustrated, they are simply pipes of rectangular cross-section having a multiplicity of openings along their length to vent air or other coolant gas onto the sheet 12 at the area when it first takes its sheet form.

In practice the main working faces 10 of the drawbars are mutually spaced a distance of one to four inches. The top of the body portion 7 ordinarily will be immersed from four to eight inches or more below the surface of the molten glass and the extensions 8 may appropriately extend about two to four inches above the surface of the glass. These dimensions may, of course, be varied according to the exact type of furnace used together with other variables, but are applicable to certain installations with which applicant is acquainted.

FIGURES 4 and 5 illustrate an installation which is the same as previously described.

A furnace 12 contains a mass of molten glass 13. Drawbars 14 similar to the drawbars 7, 8 are provided and arranged as previously described. Glass is drawn upwardly between the bars 14 into the compartment 15 by a pair of rollers 16.

At the approximate level of the floor 17 of the compartment 15 I provide a pair of tubular coolers 18 which may, if desired, be provided with a series of vents 19 to vent a coolant directly against the sheet 20 as close as feasible to its point of emergence from the drawbars 14. Additional pairs of hollow tubes or rollers 21 immediately above the pairs 18 are provided, vertically above the pairs 18, all tubes 18 and 21 being slightly spaced from the sheet 20.

All tubes 18 and 21 are supplied with a solvent, preferably of gaseous form, by a compressor 22 which forces the gas through a cooling coil 23 and into a reservoir 24 which feeds the tubes 18 and 21 through expansion valves 25. The tubes 21 empty into a header 26 from which the gas is returned to the compressor by a pipe 27. The supply line 28 leads from a source of supply to the compressor to replenish the gas vented through the openings 19.

The outer ends of the tubes 18 may rest upon the extensions of the drawbars 14 for support.

What I claim is:

1. In an apparatus for the vertical drawing of glass from a molten mass into a continuous sheet, a vat containing a mass of molten glass, a compartment above said vat comprising a zone of sheet formation, spaced parallel drawbars having a main working portion of substantially square cross-section submerged substantially below the surface of said molten mass and supported by opposite sides of said vat, spaced pairs of driven rollers within said compartment drawing glass between said drawbars and vertically upward into said compartment, each of said drawbars having an extension of rectangular shape which extends vertically through and outwardly above the surface of said molten mass, said extensions each being set back from the outer faces of said drawbars so that the molten glass flows on top of said main working portions and set back from the working faces of said drawbars so that they do not contact the glass being drawn upwardly between said bars, said extensions functioning as skimmers to prevent the passage of debris into said zone of formation.

2. In an apparatus for the vertical drawing of glass into a continuous sheet, a vat containing a mass of molten glass, a compartment having a floor above said vat comprising a zone of sheet formation, spaced parallel drawbars having working portions of generally rectangular cross-section substantially immersed in said molten mass and supported by opposite walls of said vat, an extension arising upwardly from each of said drawbars and extending substantially above the surface of said molten mass, said extensions each being set back from the outer faces of said working portions so that the molten glass flows thereon and set back from the facing surfaces of said working portions so that they are free of contact with the glass being drawn upwardly between said working portions, a plurality of pairs of rollers within said compartment drawing glass into sheet form between said drawbars and into said zone of formation, said extensions acting as skimmers to block the passage of debris on the surface of said glass into said zone of formation, hollow coolers supported on said extensions, the coolers having a general elongated oval shape and each having openings therethrough, means pumping a cooling gas into said coolers and outwardly through said openings, said coolers extending substantially upwardly from said extensions past said floor and into said zone of formation, said floor, said extensions and said coolers together largely blocking the flow of flue gases into said zone of formation.

References Cited by the Examiner

UNITED STATES PATENTS

| | | | |
|---|---|---|---|
| 2,258,118 | 10/41 | Magrini | 65—204 |
| 2,598,893 | 6/52 | Drake | 65—204 X |
| 2,607,168 | 8/52 | Drake | 65—204 |

DONALL H. SYLVESTER, *Primary Examiner.*